(12) United States Patent
Tada et al.

(10) Patent No.: US 9,908,581 B2
(45) Date of Patent: Mar. 6, 2018

(54) VEHICLE BODY FRAME OF SADDLE-RIDE-TYPE VEHICLE

(71) Applicant: HONDA MOTOR CO., LTD., Tokyo (JP)

(72) Inventors: Masashi Tada, Wako (JP); Yusuke Inoue, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 65 days.

(21) Appl. No.: 15/072,847

(22) Filed: Mar. 17, 2016

(65) Prior Publication Data

US 2016/0288858 A1   Oct. 6, 2016

(30) Foreign Application Priority Data

Mar. 31, 2015 (JP) ................. 2015-073614

(51) Int. Cl.
| | |
|---|---|
| B62K 19/18 | (2006.01) |
| B62K 11/04 | (2006.01) |
| B62K 19/04 | (2006.01) |
| B62K 19/20 | (2006.01) |
| B62K 19/28 | (2006.01) |
| B62K 25/12 | (2006.01) |

(52) U.S. Cl.
CPC .............. *B62K 19/18* (2013.01); *B62K 11/04* (2013.01); *B62K 19/04* (2013.01); *B62K 19/20* (2013.01); *B62K 19/28* (2013.01); *B62K 25/12* (2013.01)

(58) Field of Classification Search
CPC ........ B62K 19/18; B62K 19/20; B62K 11/01; B62K 11/04
See application file for complete search history.

(56) References Cited

U.S. PATENT DOCUMENTS

| | | | |
|---|---|---|---|
| 4,139,072 A | 2/1979 | Dawson | |
| 8,689,922 B2* | 4/2014 | Kishikawa | ............. B62K 19/06 180/219 |
| 2005/0061786 A1* | 3/2005 | Saito | .................. B23K 15/0053 219/121.64 |

FOREIGN PATENT DOCUMENTS

| | | |
|---|---|---|
| EP | 2548791 A2 | 1/2013 |
| JP | 2000-006870 A | 1/2000 |

* cited by examiner

*Primary Examiner* — Kevin Hurley
(74) *Attorney, Agent, or Firm* — Birch, Stewart, Kolasch & Birch, LLP

(57) ABSTRACT

A vehicle body frame of a saddle-ride-type vehicle which enables a high-strength joint and a reduction in the weight of the vehicle body frame. The vehicle body frame of a saddle-ride-type vehicle includes a plurality of rear frames arranged to face each other in an opposed manner and a cross frame for connecting the plurality of rear frames to each other. A through hole is formed in the rear frames arranged to face each other in an opposed manner with the cross frame being joined to the rear frames at insertion portions thereof inserted into the through holes.

12 Claims, 10 Drawing Sheets

VEHICLE BODY FRAME OF SADDLE-RIDE-TYPE VEHICLE

CROSS-REFERENCE TO RELATED APPLICATIONS

The present application claims priority under 35 USC 119 to Japanese Patent Application No. 2015-073614 filed Mar. 31, 2015 the entire contents of which are hereby incorporated by reference.

BACKGROUND OF THE INVENTION

1. Field of the Invention

The present invention relates to a vehicle body frame of a saddle-ride-type vehicle. More particularly, to a vehicle body frame of a saddle-ride-type vehicle having a cross frame for connecting frames to each other in a vehicle width direction.

2. Description of Background Art

In a vehicle body frame of a saddle-ride-type vehicle such as a conventional motorcycle, the vehicle body frame adopts the frame structure where the vehicle body frame includes a plurality of skeletal frames arranged along a longitudinal direction of the vehicle and a cross frame for reinforcing the skeletal frames by connecting the skeletal frames to each other in a vehicle width direction. See, for example, JP-A-2000-6870. The joint structure of the cross frame disclosed in JP-A-2000-6870 includes a structure having distal end surfaces of the cross frame that are brought into contact with inner side surfaces of skeletal frames which face each other in an opposed manner in the vehicle width direction. Such contact portions are welded to each other in such a contact state. The structure may include side surfaces of the cross frame that are brought into contact with upper surfaces of the skeletal frames in an overlapping manner with the contact portions being welded to each other in such a state.

In the conventional welding disclosed in JP-A-2000-6870 where the skeletal frames and the cross frame are welded to each other, the welding adopts the joint structure where the distal end surfaces or the side surfaces of the cross frame are brought into contact with the side surfaces of the skeletal frames and outer peripheries of contact end surfaces are welded. Accordingly, a welded part having a predetermined length is necessary to ensure joining strength. As a result, to increase a length of the contact end surface provided for welding, it is necessary to increase a width or a cross-sectional size of the cross frame. Accordingly, the joint structure becomes a large factor which brings about large-sizing of the cross frame and an increase of the weight of the cross frame thus impairing a reduction in the weight of the vehicle body frame.

SUMMARY AND OBJECTS OF THE INVENTION

The invention has been made in view of the above-mentioned circumstances. It is an object of an embodiment of the present invention to provide a vehicle body frame of a saddle-ride-type vehicle which enables a high-strength joint and a reduction in the weight of the vehicle body frame.

To achieve the above-mentioned object, an embodiment of the present invention is directed to a vehicle body frame of a saddle-ride-type vehicle which includes:

a plurality of skeletal frames arranged to face each other in an opposed manner; and a cross frame which connects the plurality of skeletal frames to each other, wherein:

through holes are formed in the skeletal frames arranged to face each other in an opposed manner, and the cross frame is joined to the skeletal frame at insertion portions thereof inserted into the through holes.

According to an embodiment of the present invention, the distal end portions of the cross frame are welded to inner surfaces of the through holes.

According to an embodiment of the present invention, the through holes are formed in portions of the skeletal frames arranged parallel to each other in an oppositely facing manner, and the through holes are formed in the skeletal frames in a penetrating manner such that the through holes face each other in an opposed manner.

According to an embodiment of the present invention, the cross frame is formed into a C shape where at least a portion of a transverse cross section is discontinuous.

According to an embodiment of the present invention, a C-shaped end portion of the cross frame is disposed on a rear side in a longitudinal direction of the vehicle, and a bracket is continuously formed on the end portion.

According to an embodiment of the present invention, the skeletal frames include:

a main frame extending toward the rear side in the longitudinal direction of the vehicle from a head pipe;

a pivot frame extending downward from a rear side of the main frame;

a seat frame extending toward the rear side in the longitudinal direction of the vehicle from the main frame;

a support frame extending toward the rear side in the longitudinal direction of the vehicle and upward from the pivot frame; and a rear frame extending toward a rear side of the seat frame, wherein:

a merging portion for merging the rear frame with the seat frame and the support frame is formed on the rear frame, and the through hole is formed in the rear frame, and the cross frame is mounted in the through holes.

According to an embodiment of the present invention, the rear frame is formed such that at least one from either a thickness of the rear frame in a vehicle height direction or a width of the rear frame in a vehicle width direction is reduced toward a rear side in a longitudinal direction of the vehicle.

According to an embodiment of the present invention, the rear fenders are provided with fender support portions to which rear end portion of the rear frame are inserted therein so that the rear fenders are capable of being supported.

According to an embodiment of the present invention, the through holes are simultaneously formed in an extruding direction at the time of forming the skeletal frame by extrusion molding.

According to an embodiment of the present invention, the through holes are formed in the skeletal frames which are arranged to face each other in an opposed manner. Thus, the weight of the skeletal frames can be reduced. Further, the cross frame is joined to the skeletal frames at insertion portions thereof inserted into the through holes. Thus, the insertion portions of the cross frame can be brought into contact with the through holes whereby joining strength can be improved.

According to an embodiment of the present invention, the distal end portions of the cross frame are welded to the inner surfaces of the through holes. Thus, the welded portions can be formed in the through holes whereby the welded portions can be largely formed so as to cover the distal end portions thus increasing joining strength.

According to an embodiment of the present invention, the through holes are formed in portions of the skeletal frames arranged parallel to each other in an opposedly facing manner, and the through holes are formed in the skeletal frames in a penetrating manner such that the through holes face each other in an opposed manner. Thus, an outer peripheral surface of the cross frame which passes through the through holes can be surely brought into contact with the inner surfaces of the through holes whereby joining strength can be increased.

According to an embodiment of the present invention, the cross frame is formed into a C shape where at least a portion of a transverse cross section is discontinuous. Thus, the cross frame can be welded to the inner surfaces of the through holes so that joining strength can be ensured. Further, the weight of the cross frame can be reduced due to the structure wherein a portion of the transverse cross section is cut away.

According to an embodiment of the present invention, the C-shaped end portion of the cross frame is disposed on the rear side in the longitudinal direction of the vehicle, and the bracket is continuously formed on the end portion. Thus, the bracket is integrally formed with the cross frame so that strength of the bracket is improved. Further, the bracket can be integrally formed with the cross frame. Thus, the bracket can be formed at the time of forming the cross frame by molding whereby productivity can be improved and, at the same time, the number of parts can be reduced.

According to an embodiment of the present invention, the merging portion for merging the rear frame with the seat frame and the support frame is formed on the rear frame, and the through hole is formed in the rear frame. Thus, a weight of the rear frame positioned on a rear and upper end portion of the vehicle body frame can be reduced. As a result, a weight of the vehicle body frame can be concentrated on a side close to the center of the vehicle thus improving the weight balance of the vehicle body frame. Further, the cross frame is mounted on the rear frame. Thus, the strength of the rear frame can be improved.

According to an embodiment of the present invention, the rear frame is formed such that at least one from either a thickness of the rear frame in a vehicle height direction or a width of the rear frame in a vehicle width direction is reduced toward a rear side in a longitudinal direction of the vehicle. Thus, a reduction in the weight of a rear side of the vehicle can be accelerated whereby the weight of the vehicle body frame can be concentrated on a side close to the center of the vehicle thus improving the weight balance of the vehicle body frame.

According to an embodiment of the present invention, the rear fenders are provided with the fender support portions to which the rear end portion of the rear frame are inserted therein so that the rear fenders are capable of being supported. Thus, the rear fender can be positioned by merely inserting the rear fender into the rear end portion of the rear frame. As a result, the assembling property of the rear fender can be improved.

According to an embodiment of the present invention, the through holes are simultaneously formed in an extruding direction at the time of forming the skeletal frame by extrusion molding. Thus, a plurality of through holes can be formed simultaneously whereby productivity can be improved thus reducing the production cost. Further, due to the manufacture of the skeletal frame by extrusion molding, an error in size attributed to spring back after molding such as press molding does not occur. Thus, molding accuracy can be improved thus providing the skeletal frame with a high accuracy and, at the same time, the through hole and the cross frame are brought into contact with each other without any error.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a motorcycle according to an embodiment of the invention is explained with reference to FIGS. 1 to 10. The drawings are viewed in the direction of symbols and, in the explanation made hereinafter, directions such as "front," "rear," "left," "right," "up" and "down" are described in accordance with directions as viewed from a rider. In the respective drawings, symbol Fr indicates a front side of the vehicle, symbol Rr indicates a rear side of the vehicle, symbol L indicates a left side of the vehicle, symbol R indicates a right side of the vehicle, symbol U indicates an upper side of the vehicle, and symbol D indicates a lower side of the vehicle. Further, directions of respective parts of the motorcycle are also described in the same manner as described above.

Figure 1:
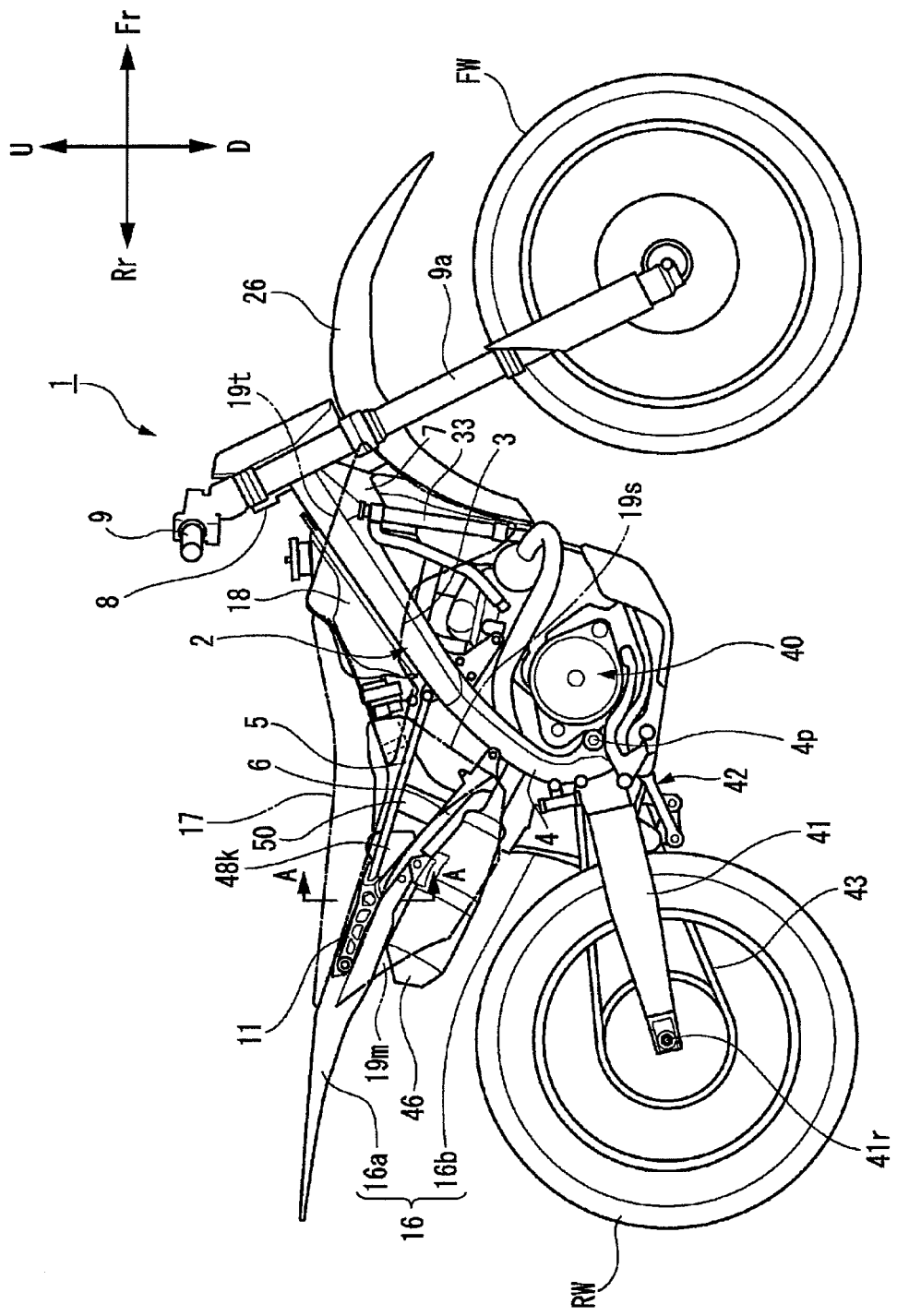
FIG. 1 is a right side view of a motorcycle according to the invention.

As shown in FIG. 1, a vehicle body frame 2 is a skeleton part of a motorcycle 1 is formed of skeletal frames including a pair of main frames 3 which extends obliquely downwardly from a head pipe 8 toward a rear side in a longitudinal direction of the vehicle and pivot frames 4 which are connected to a rear side of the main frames 3 and are positioned behind an engine 40. Seat frames 5 extend rearwardly and upwardly from rear end portions of the main frames 3 and support a rider's seat 17. Support frames 6 extend rearwardly and upwardly from the pivot frames 4 and are connected to rear ends of the seat frames 5; rear frames 11 which extend rearwardly from the rear ends of the seat frames 5. A down frame 7 extends toward a lower side and a rear side of the vehicle from the head pipe 8 and the like.

A front fork 9a, connected to the head pipe 8, is mounted on a front portion of the vehicle with a front wheel FW being mounted on a lower end portion of the front fork 9a and a handle bar 9 being mounted on an upper end portion of the front fork 9a.

A front portion of a swing arm 41 is mounted on the pivot frames 4 in a vertically swingable manner using a pivot shaft 4p as a fulcrum. A rear wheel RW is rotatably supported on a rear end support shaft 41r mounted on the swing arm 41. The swing arm 41 is suitably supported by a rear shock absorber mechanism 42. The rear wheel RW is driven by a chain 43 extending between and wound around a drive sprocket disposed on an engine 40 side (not shown in the drawing) and a driven sprocket supported on a rear wheel RW side (not shown in the drawing).

In this embodiment, a fuel tank 18 is arranged between the main frames 3 in front of the rider's seat 17. As cover members, a front fender 26 which covers an upper portion of the front wheel FW and a rear fender 16 which covers an upper portion of the rear wheel RW are provided. Further, for example, a top shelter (not shown in the drawing) which covers an upper portion of the fuel tank 18, a shroud 19t which covers lateral sides of the fuel tank 18 from lateral sides of a radiator 33 and covers a lower side of a front half portion of the rider's seat 17, side covers 19s which cover the lateral sides of the vehicle behind the shroud 19t and, further, a muffler cover 19m which covers a muffler 46 and the like are provided when necessary.

Hereinafter, the embodiment is explained in detail with reference to FIGS. 2 to 10 which show the respective parts of the motorcycle 1 in an enlarged manner or in an exploded manner.

Figure 2:
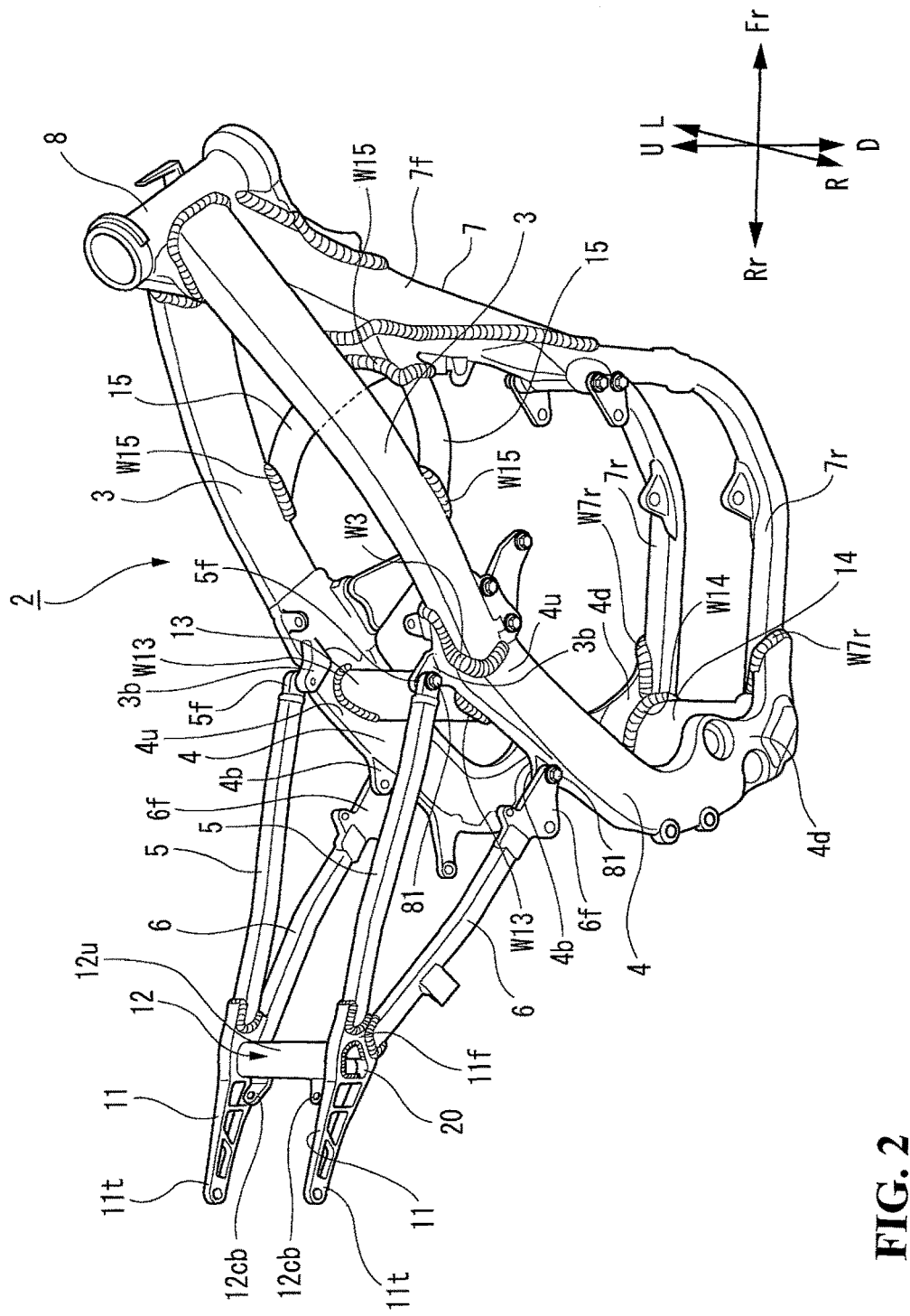
FIG. 2 is a perspective view showing a vehicle body frame of the motorcycle shown in FIG. 1.

In this embodiment, as shown in FIG. 2 in an enlarged manner, the vehicle body frame 2 is configured such that a plurality of skeletal frames are arranged in an opposedly facing manner along the longitudinal direction of the vehicle body. As described herein, the skeletal frames, that is, the main frames 3, the pivot frames 4, the seat frames 5, the support frames 6, the rear frames 11, and the down frame 7 are respectively constituted of a plurality of frames (a pair of left and right frames except for the down frame 7) extending in the longitudinal direction of the vehicle. As connecting members which connect these pairs of frames arranged in an opposedly facing manner, cross frames 12, 13, 14 and 15 are provided. The down frame 7 is configured to have one down frame front portion 7f which extends downwardly and rearwardly from the head pipe 8, and two down frame rear portions 7r which are bifurcated at a lower end side of the down frame 7.

The pivot frames 4, the seat frames 5, the support frames 6, the rear frames 11, rear portions of the main frames 3, and rear end portions of the down frame rear portions 7r are respectively formed of a pair of left and right frames arranged parallel to each other in an opposedly facing manner. The seat frame 5 is configured such that a seat frame front end portion 5f is fixed to a fixed bracket 3b formed on a rear portion of the main frame 3 by a frame fixing bolt 81. The support frame 6 is configured such that a support frame front end portion 6f is fixed to a fixed bracket 4b formed on the pivot frame 4 by the frame fixing bolt 81.

The cross frame 15 has a bent shape projecting toward a front side in the longitudinal direction of the vehicle, and connects the left and right main frames 3 and the down frame front portion 7f in front of the left and right main frames 3 to each other in the vehicle width direction by way of welded portions W15. The cross frame 14 connects lower end portions 4d of the left and right pivot frames 4 to each other in the vehicle width direction by way of welded portions W14 (only the welded portion on one side shown in FIG. 2). The cross frame 13 connects upper end portions 4u of the left and right pivot frames 4 to each other in the vehicle width direction by way of welded portions W13. The upper end portion 4u of the pivot frame 4 is connected to the main frame 3 by way of a welded portion W3.

A welded portion W7r which connects the lower end portion 4d of the pivot frame 4 and the down frame rear portion 7r to each other is formed in front of the welded portion W14.

The cross frame 12 connects rear end portions of the left and right seat frames 5 and the support frames 6 and front end portions of the rear frames 11 to each other in the vehicle width direction. More specifically, a merging portion 11f for merging the rear frame 11 with the seat frame 5 and the support frame 6 is formed on the rear frame 11. A through hole 20 is formed in the left and right merging portions 11f, respectively, and the left and right rear frames 11 are connected to each other by mounting the cross frame 12 in the through holes 20.

Figure 3:
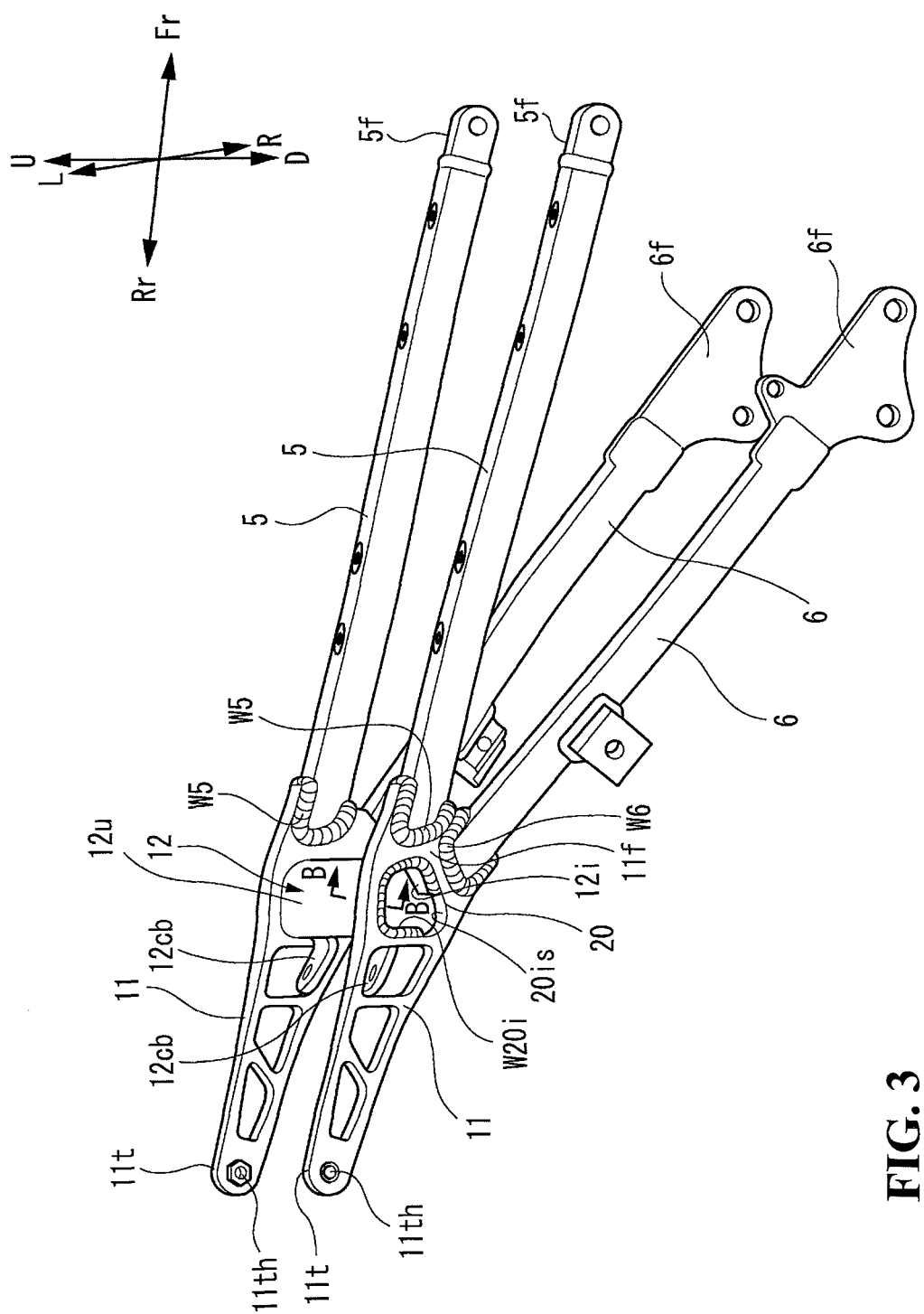
FIG. 3 is an enlarged perspective view of a rear portion of a frame in the vehicle body frame shown in FIG. 2.

As shown in FIG. 3, in the merging portion 11f, the seat frame 5 is brought into contact in a biting manner with an upper side of a front end portion of the rear frame 11 and is connected to the upper side of the front end portion of the rear frame 11 by way of a welded portion W5, and the support frame 6 is brought into contact in a biting manner with a lower side of the front end of the rear frame 11 and is connected to the lower side of the front end portion of the rear frame 11 by way of a welded portion W6.

Figure 4:
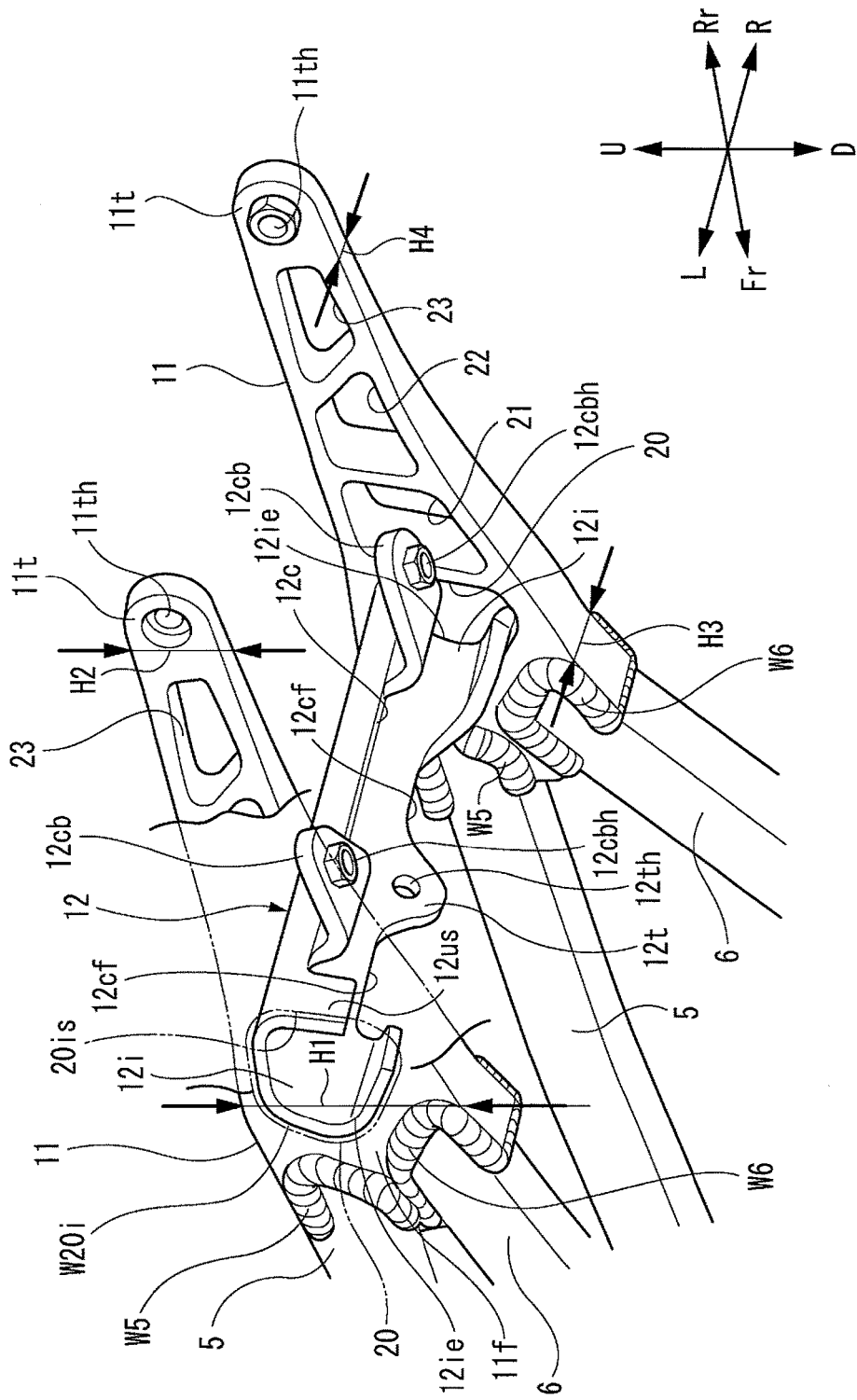
FIG. 4 is an enlarged perspective view of an essential part showing a state before a cross frame shown in FIG. 2 is joined.

In this embodiment, as shown in FIG. 4, the through holes 20 are formed between the rear frames 11 which are arranged opposite to each other such that the through holes 20 face each other in an opposed manner. The cross frame 12 is inserted into the through holes 20 and is connected to the rear frames 11. More specifically, insertion portions 12i formed on both ends of the cross frame 12 are inserted into the through holes 20, respectively, and welded portions W20i are formed in a state where distal end portions 12ie of the insertion portion 12i are brought into contact with inner surfaces 20is of the through holes 20. The through hole 20 is formed into an approximately rectangular shape having four rounded corners, for example. A transverse cross-sectional shape of the left and right distal end portions 12ie of the cross frame 12 is also formed into a C shape having four sides corresponding to a shape of the through hole 20.

Figure 5:
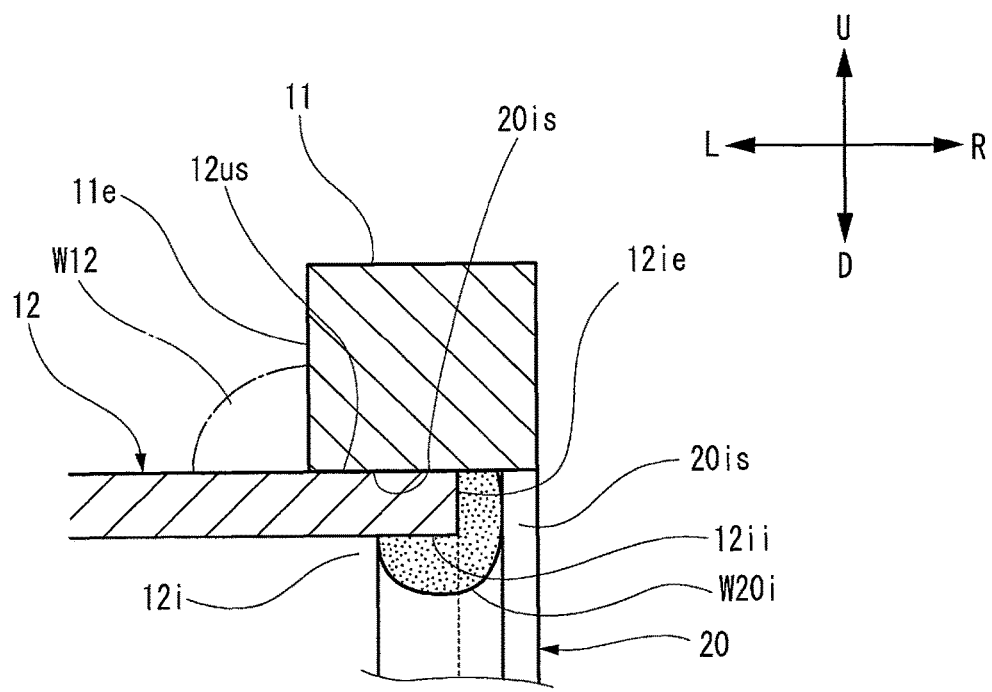
FIG. 5 is a partially cross-sectional view of a portion taken along a line B-B in FIG. 3.

As shown in FIG. 4, the rear frames 11 are arranged parallel to each other, and the left and right through holes 20 are formed into the same shape such that the left and right through holes 20 face each other in an opposed manner in the direction orthogonal to the rear frames 11 (lateral direction). Accordingly, as shown in FIG. 5, outer peripheral surfaces 12us of the left and right insertion portions 12i and the inner surfaces 20is of the through holes 20 are arranged in a state where the outer peripheral surface 12us and the inner surface 20is are surely brought into contact with each other and, further, the cross frame 12 and the rear frames 11 are welded to each other in such a state. In welding of the cross frame 12, as shown in FIG. 5, a weld bead of the welded portion W20i is formed so as to cover the distal end portion 12ie and a distal end inner side 12ii of the insertion portion 12i. Further, a weld bead of a welded portion W12 (indicated by a chained line in FIG. 5) may be formed between an inner side surface 11e of the rear frame 11 and the outer peripheral surface 12us of the cross frame 12. In this manner, the insertion portion 12i of the cross frame 12 provides firm welding which covers the distal end portion 12ie and the distal end inner side 12ii inside the through hole 20. Further, as shown in FIG. 5, by adopting the structure where the welded portion W12 is also disposed outside the insertion portion 12i, it is possible to provide the firmer welded structure.

As shown in FIG. 4, in this embodiment, at least a portion of a transverse cross section of the cross frame 12 is formed into a discontinuous C shape. Further, the left and right insertion portions 12i are formed such that the outer peripheral surface 12us is larger than an outer peripheral surface of a center portion of the cross frame 12 so as to increase a circumferential length along which the outer peripheral surface 12us is brought into contact with the through hole 20. On the other hand, a portion of the cross frame 12 close to the center of the cross frame 12 is formed into a largely notched shape. More specifically, a distance between an end portion 12c on a rear side of the cross frame 12 and a front end portion 12cf on a front side of the cross frame 12 is set larger than that of the insertion portion 12i.

A pair of left and right brackets 12cb is formed on the end portion 12c of the cross frame 12 in an extending manner toward a rear side in the longitudinal direction of the vehicle. A mounting screw hole 12cbh used for fixing the rear fender 16 to the cross frame 12 is formed in the brackets 12cb. A battery case support portion 12t is formed on a front end portion 12cf of the cross frame 12 on a side opposite to the end portion 12c in an extending manner. A battery case 48k (see FIG. 9) can be fixed to the battery case support portion 12t.

The cross frame 12 of this embodiment is manufactured using a plate-like raw material. More specifically, the cross frame 12 is formed by forming a plate-like member into a C shape in transverse cross section by press working, and the brackets 12cb and the battery case support portion 12t are formed simultaneously with such forming of the cross frame 12.

Figure 6:
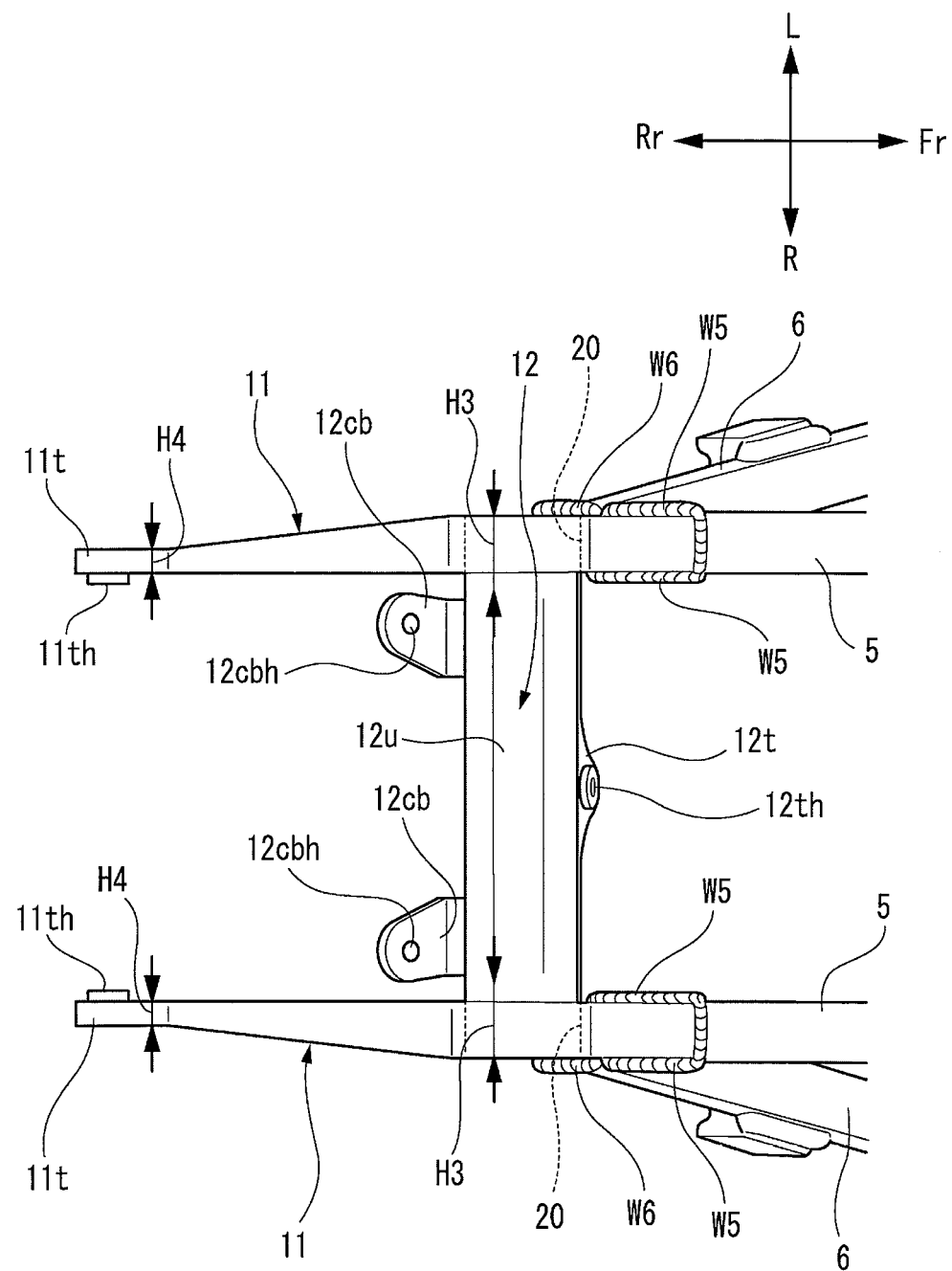
FIG. 6 is a plan view of a joint portion of the cross frame shown in FIG. 2 as viewed from above.

As shown in FIG. 4, the rear frame 11 of this embodiment is formed such that a thickness of the rear frame 11 in a vehicle height direction is gradually decreased as the rear frame 11 extends rearwardly such that a thickness of the rear frame 11 on a front side in the longitudinal direction of the vehicle becomes a maximum thickness H1 and the thickness of the rear frame 11 on a rear side in the longitudinal direction of the vehicle becomes a minimum thickness H2. Further, as shown in FIG. 6, the rear frame 11 is formed such that a width of the rear frame 11 in the vehicle width direction is also gradually decreased as the rear frame 11 extends rearwardly such that a width of the rear frame 11 on a front side in the longitudinal direction of the vehicle becomes a maximum width H3 and a width of the rear frame 11 on a rear side in the longitudinal direction of the vehicle becomes a minimum width H4.

In addition, the through holes 20 in which the cross frame 12 is mounted, other through holes 21, 22, 23 are formed in the rear frame 11. Accordingly, a reduction in the weight of the frames on a rear side of the vehicle can be realized. A screw receiving portion 11th is formed in a rear end portion 11t of the rear frame 11. The screw receiving portion 11th is formed such that a fixing screw 83 described later for mounting the rear fender 16 to the rear frame 11 can be threadedly engaged with the screw receiving portion 11th.

In this manner, although the rear frames 11 of this embodiment have a structure wherein the rear frame 11 is tapered toward the distal end thereof as well as a structure wherein the through holes 20, 21, 22, 23 are formed in the rear frame 11 as described above, the rear frames 11 can secure a sufficient strength since the rear frames 11 are provided for merely supporting the rear fender 16.

The rear frame 11 of this embodiment can be manufactured by extrusion molding, for example. More specifically, a plate-like intermediate product in which through holes 20, 21, 22, 23 and a hole for screw receiving portion 11th are simultaneously formed is manufactured, and this intermediate product is cut into a predetermined width thus manufacturing the rear frames 11. The screw receiving portion 11th is mounted in a hole for screw receiving portion 11th.

The mounting structure of the rear fender 16 according to this embodiment is explained with reference to FIGS. 7 to 9. The rear fender 16 of this embodiment is formed of, for example, a rear-side rear fender 16a arranged above the rear wheel RW, and a front-side rear fender 16b arranged at an upper front side and a front side of the rear wheel RW.

Figure 7:
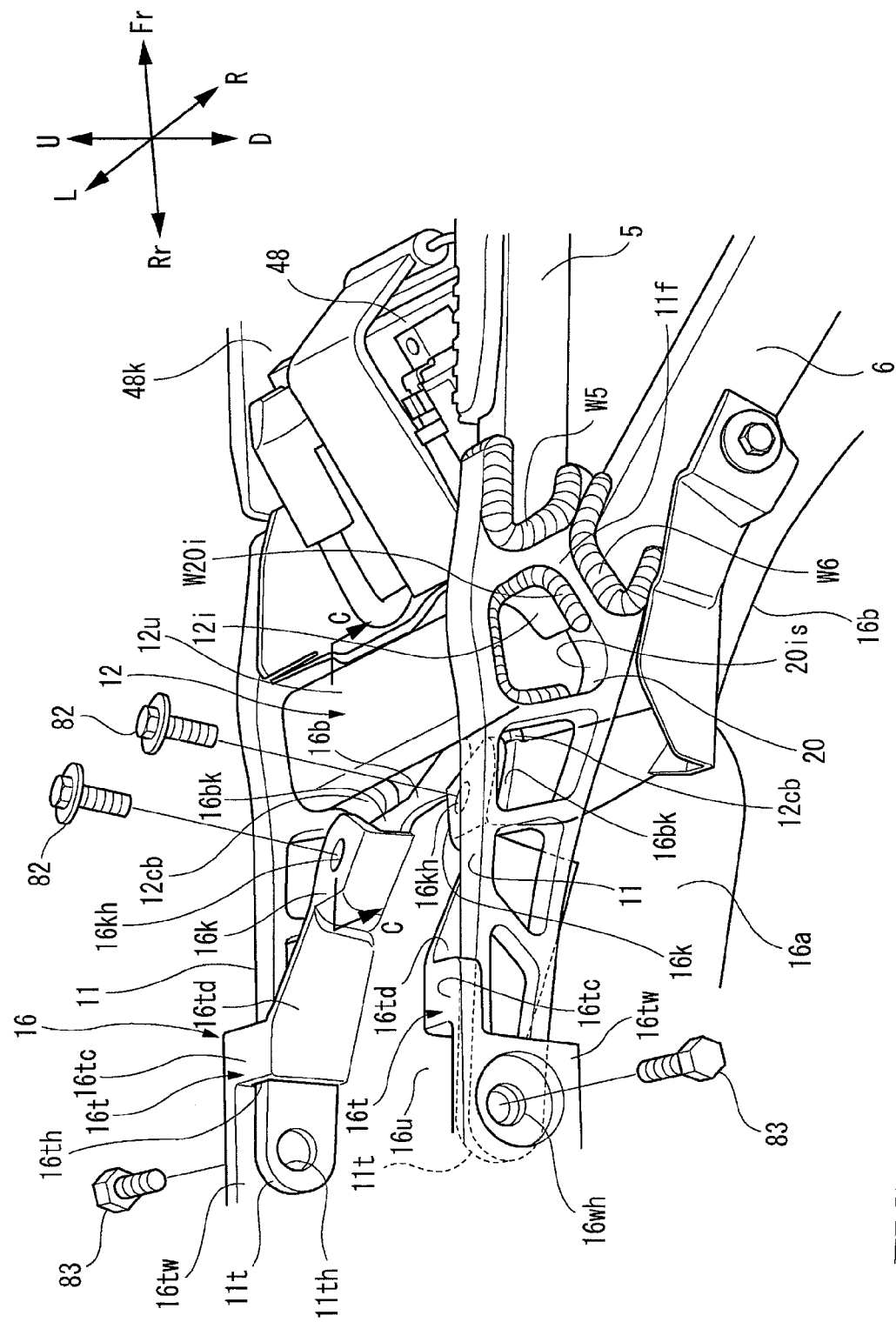
FIG. 7 is an enlarged perspective view of an essential part before a rear fender is fixed in the motorcycle shown in FIG. 1.
Figure 8:
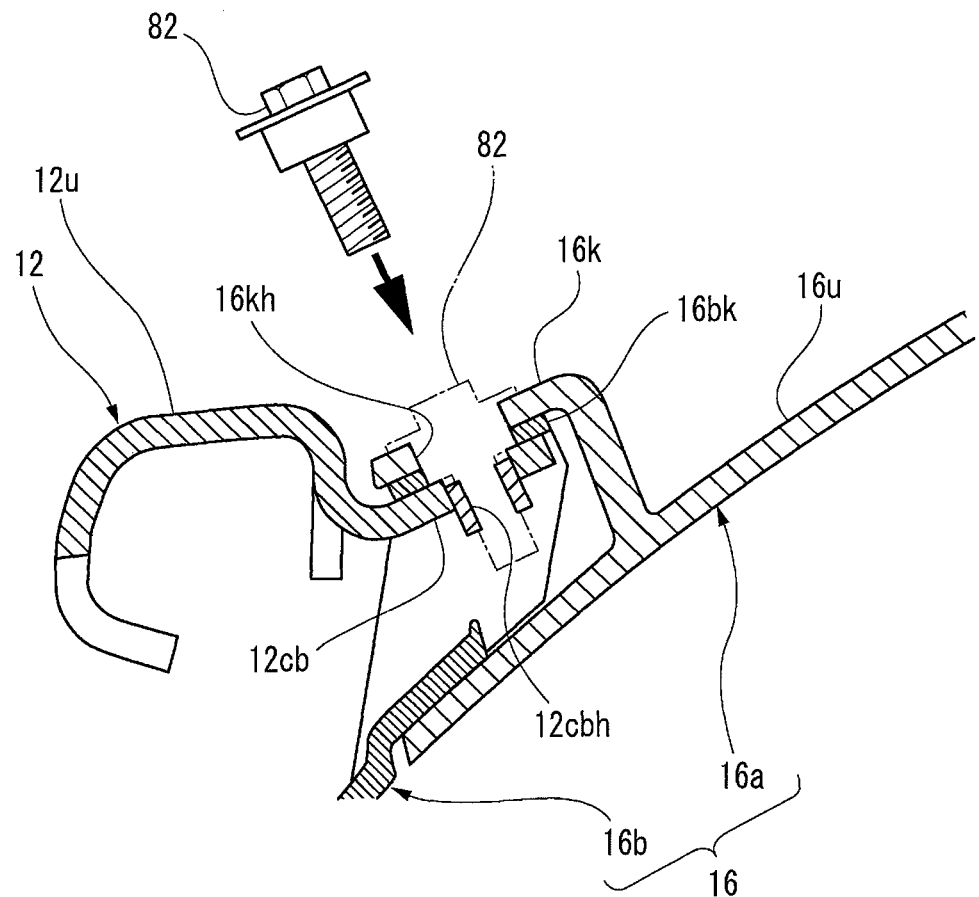
FIG. 8 is a partially cross-sectional view of a portion taken along a line C-C in FIG. 7.

As shown in FIG. 7, a pair of left and right fender support portions 16t into which the rear end portions 11t of the rear frames 11 are insertable is mounted on the rear-side rear fenders 16a of the rear fenders 16, respectively. The fender support portion 16t is configured such that an inner wall 16td and an outer wall 16tw are formed above a rear fender upper surface 16u in an upwardly projecting manner along the longitudinal direction of the vehicle in a state where the inner wall 16td and the outer wall 16tw are displaced from each other in the lateral direction as well as in the longitudinal direction, and a connecting wall 16tc connects the inner wall 16td and the outer wall 16tw to each other at upper portions of the respective walls 16td, 16tw. An insertion opening 16th (see FIGS. 7 and 9) into which the rear end portion 11t of the rear frame 11 is insertable is formed between the inner wall 16td and the outer wall 16tw. A fixing screw insertion hole 16wh which corresponds to the screw receiving portion 11th of the rear frame 11 is formed in the outer wall 16tw. Fender fixing portions 16k which correspond to the brackets 12cb of the cross frame 12 are formed on front portions of the inner walls 16td. More specifically, in the fender fixing portion 16k, a mounting hole 16kh which corresponds to the mounting screw hole 12cbh formed in the bracket 12cb (see FIG. 4) is formed in an approximately horizontal wall surface of the front portion of the inner wall 16td.

In mounting the rear fender 16 of this embodiment, firstly, as shown in FIG. 7, the rear fender support portions 16t of the rear-side rear fender 16a are inserted into the rear end portions 11t of the rear frames 11, respectively and, at the same time, the rear fender 16 is mounted in a state where the fender fixing portions 16k are positioned above the brackets 12cb, respectively. Due to such an operation, the rear-side rear fender 16a is temporarily fixed to and supported on the rear frames 11. As shown in FIG. 8, fixing portions 16bk of the front-side rear fender 16b are arranged such that the front-side rear fender 16b is sandwiched between the bracket 12cb and the fender fixing portion 16k.

Figure 9:
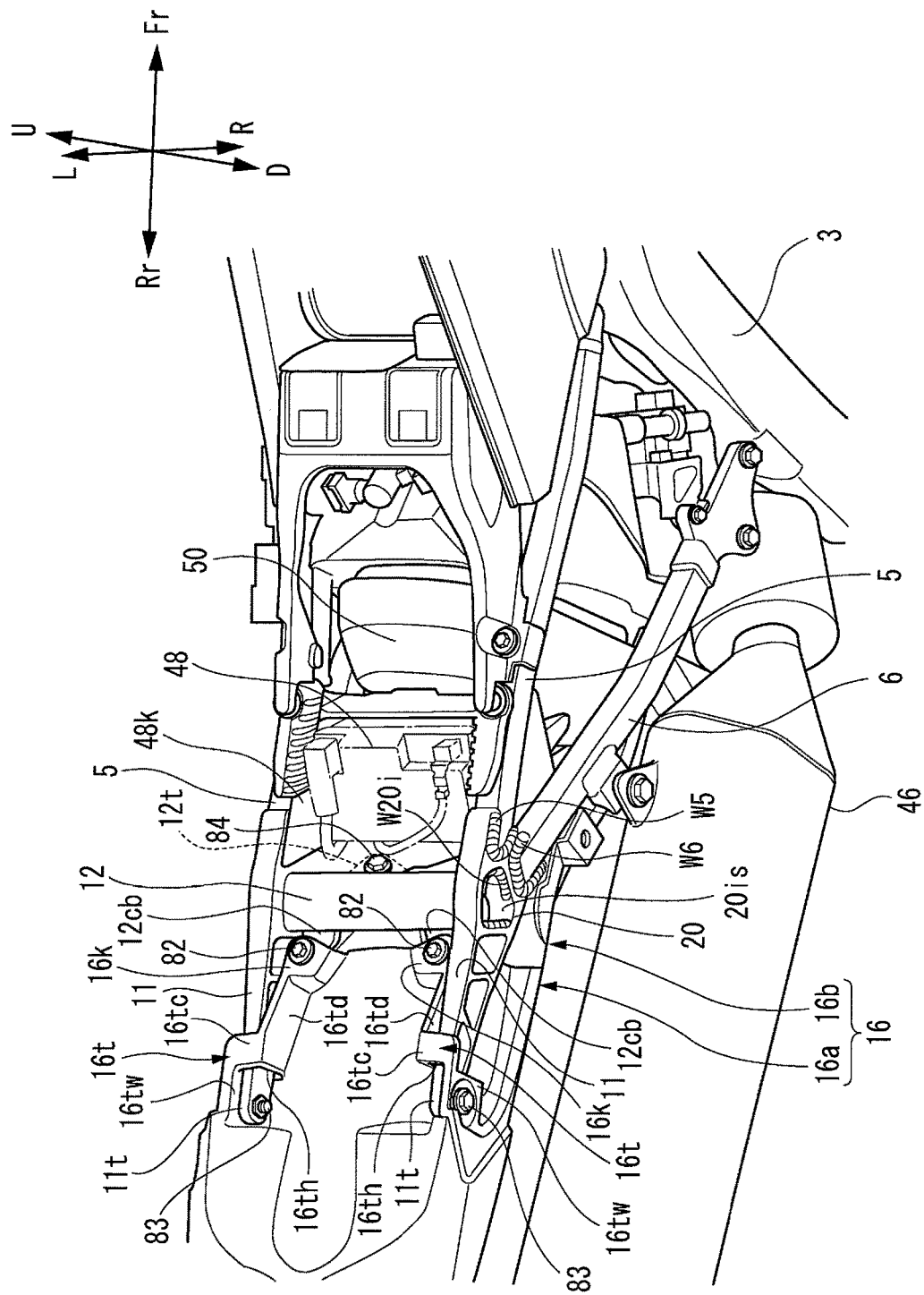
FIG. 9 is a perspective view of an essential part showing the internal structure in a state where a side cover and a rider's seat are removed in the motorcycle shown in FIG. 1.

As shown in FIG. 9, by making the fender fixing screws 82 threadedly engage with the mounting screw holes 12cbh of the brackets 12cb and, at the same time, by making the fixing screws 83 threadedly engage with the screw receiving portions 11*th*, the rear-side rear fender 16*a* and the front-side rear fender 16*b* are fastened and fixed to the rear frames 11 together. Other suitable portions of the rear fender 16 are fixed so that the rear fender 16 is mounted on the rear frames 11 in a state where the rear fender 16 covers the rear frames 11 and lower sides of the support frames 6.

In this manner, in the rear fender 16 of this embodiment, the fastening of the rear fender 16 on a front side in the longitudinal direction of the vehicle is not performed by the fastening in the sideward direction but is performed by the fastening in the vertical direction as described above. Accordingly, as shown in FIG. 8, by adopting the structure where the fixing portions 16*bk* are placed on the brackets 12*cb*, respectively, and the fixing portions 16*bk* are covered by the fender fixing portions 16*k* from above, a parts setting state becomes stable. Accordingly, the positioning of holes for fastening, more specifically, the positioning of the mounting screw holes 12*cbh*, the mounting holes 16*kh* and the like can be easily performed, thus providing a structure which facilitates a fastening operation. Further, the fastening structure is arranged on a rear fender upper surface 16*u* side. Thus, the structure is excellent also in maintenability.

As shown in FIGS. 7 and 9, the battery case 48*k* which stores a battery 48 is disposed on a front side of the cross frame 12 in the longitudinal direction of the vehicle. A rear end side of the battery case 48*k* is held by a fixing screw 84 which is threadedly engaged with the screw receiving hole 12*th* (see FIGS. 4 and 6) formed in the battery case support portion 12*t* which is disposed on a front side of the cross frame 12 in the longitudinal direction of the vehicle.

Figure 10:
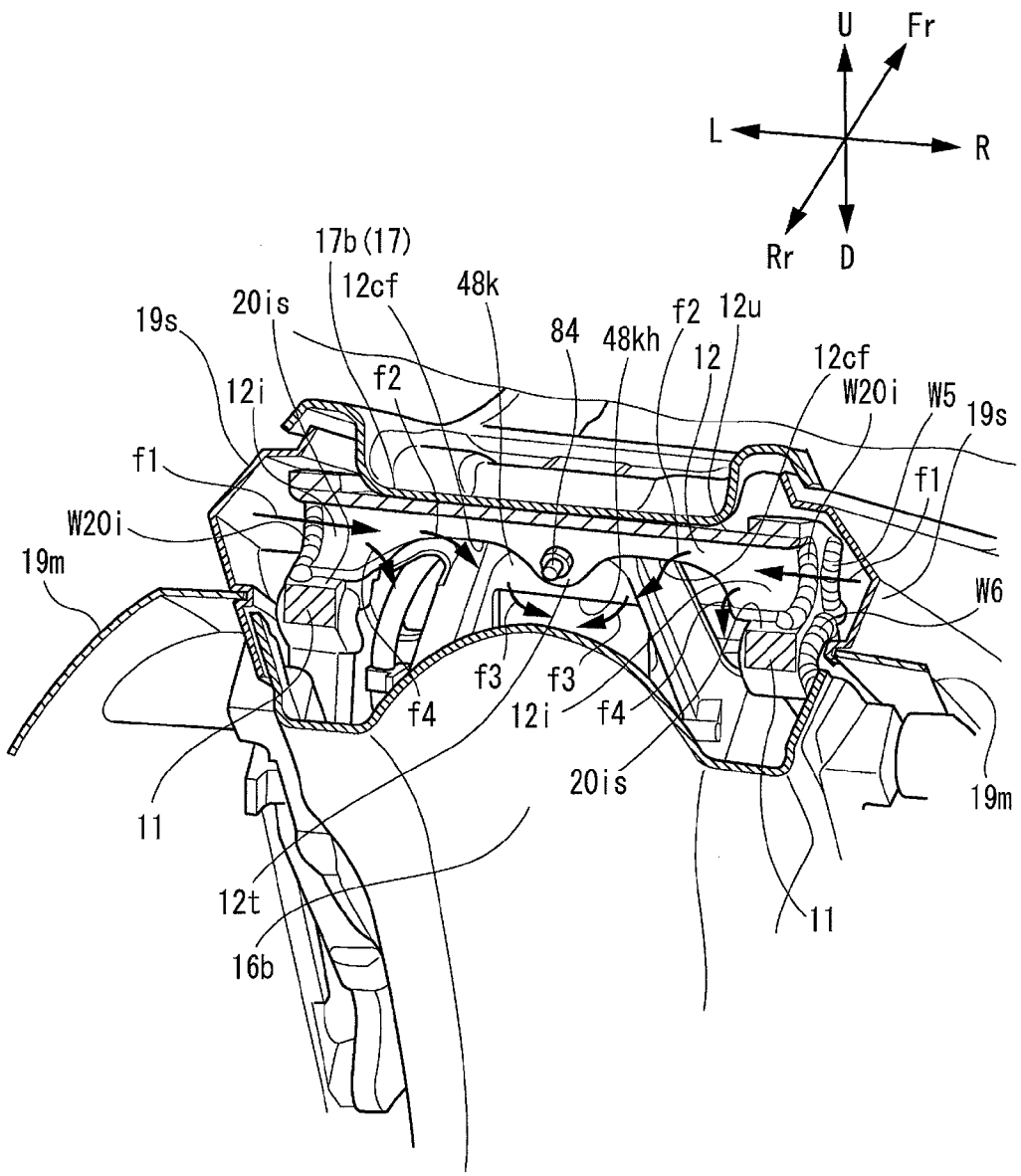
FIG. 10 is a cross-sectional perspective view of an essential part taken along a line A-A in the motorcycle shown in FIG. 1.

As shown in FIG. 10, the structure around the cross frame 12 is configured such that the rear fender 16 is positioned behind and below the battery case 48*k* with the cross frame 12 sandwiched therebetween. A bottom surface 17*b* of the rider's seat 17 is positioned above the battery case 48*k*. The side covers 19*s* are positioned on both left and right sides of the battery case 48*k*. An air cleaner 50 (see FIG. 9) is arranged in front of the battery case 48*k*. A battery case opening 48*kh* is formed in the battery case 48*k*, for example, thus enhancing ventilation on a rear side of the battery 48.

When the cross frame 12 has the structure according to this embodiment, for example, air outside the rear frames 11 can enter the inside of the rear frames 11 through the through holes 20, 21, 22, 23. Further, a flow of air which passes through the battery case opening 48*kh* and the periphery of the battery case 48*k* and flows toward the air cleaner 50 can be formed. More specifically, the cross frame 12 disposed behind the battery case 48*k* is connected to the through holes 20 with a C-shape cross section. Accordingly, as shown in FIG. 10, for example, it is possible to form air flows which pass through the inside of the insertion portions 12*i* of the cross frame 12 such as a first air flow f1, a second air flow f2, a third air flow f3 and a fourth air flow f4. Thus, the ventilation of air toward the inside of the vehicle body, and more particularly, toward the air cleaner 50 can be improved.

In this embodiment, as shown in FIG. 10, the left and right rear frames 11 have the same height, and the cross frame 12 is arranged horizontally in the lateral direction. Accordingly, the bottom surface 17*b* of the rider's seat 17 is uniformly supported by the rear frames 11 and an upper surface 12*u* of the cross frame 12.

As described above, in this embodiment, the through hole 20 is formed in the rear frames 11 which are arranged to face each other in an opposed manner. Thus, the weight of the rear frames 11 can be reduced. Further, the cross frame 12 is joined to the rear frames 11 at the insertion portions 12*i* thereof inserted into the through holes 20. Thus, the insertion portions 12*i* of the cross frame 12 can be brought into contact with the through holes 20 whereby joining strength can be improved.

In this embodiment, the distal end portions 12*ie* of the cross frame 12 are welded to the inner surfaces 20*is* of the through holes 20. Thus, the welded portions W20*i* can be formed in the through holes 20 whereby the welded portions W20*i* can be largely formed so as to cover the distal end portions 12*ie* thus increasing the joining strength.

In this embodiment, the through holes 20 are respectively formed in the rear frames 11 arranged parallel to each other such that the through holes 20 face each other in an opposed manner, and the through holes 20 are formed in the rear frames 11 in a penetrating manner. Thus, the outer peripheral surface 12*us* of the cross frame 12 which passes through the through holes 20 can be surely brought into contact with the inner surfaces 20*is* of the through hole 20 whereby joining strength can be increased.

In this embodiment, the cross frame 12 is formed into a C shape where at least a portion of a transverse cross section is discontinuous. Thus, the cross frame 12 can be welded to the inner surfaces 20*is* of the through holes 20 so that the joining strength can be ensured. Further, the weight of the cross frame 12 can be reduced due to the structure where a portion of the transverse cross section of the cross frame 12 is cut away.

In this embodiment, the C-shaped end portion 12*c* of the cross frame 12 is disposed on the rear side in the longitudinal direction of the vehicle, and the brackets 12*cb* are continuously formed on the end portion 12*c* and hence, the brackets 12*cb* are integrally formed with the cross frame 12 so that the strength of the bracket 12*cb* is improved. Further, the brackets 12*cb* can be integrally formed with the cross frame 12. Thus, the brackets 12*cb* can be formed at the time of forming the cross frame 12 by molding whereby productivity can be improved and, at the same time, the number of parts can be reduced.

In this embodiment, the merging portions 11*f* for merging the rear frame 11 with the seat frames 5 and the support frames 6 are formed on the rear frames 11, and the through holes 20 are formed in the rear frames 11, respectively. Thus, the weight of the rear frames 11 positioned on a rear and upper end portion of the vehicle body frame 2 can be reduced. As a result, a weight of the vehicle body frame 2 can be concentrated on a side close to the center of the vehicle thus improving the weight balance of the vehicle body frame 2. Further, the cross frame 12 is mounted on the rear frames 11. Thus, the strength of the rear frames 11 can be improved.

In this embodiment, the rear frames 11 are formed such that at least one from either a thickness of the rear frame 11 in a vehicle height direction or a width in of the rear frame 11 in a vehicle width direction is reduced toward a rear side in a longitudinal direction of the vehicle. Thus, a reduction in the weight of a rear side of the vehicle can be accelerated whereby a weight of the vehicle body frame 2 can be concentrated on a side close to the center of the vehicle thus improving the weight balance of the vehicle body frame 2.

In this embodiment, the rear fenders 16 are provided with the fender support portions 16*t* to which rear end portion 11*t* of the rear frame 11 are inserted therein so that the rear fenders 16 are capable of being supported. Thus, the rear fender 16 can be positioned by merely inserting the rear fender 16 into the rear end portions 11*t* of the rear frames 11. As a result, the assembling property of the rear fender 16 can be improved.

Further, in this embodiment, the through holes 20 are formed in an extruding direction at the time of forming the rear frames 11 by extrusion molding. Thus, a plurality of through holes 20 can be formed simultaneously whereby productivity can be improved thus reducing a production cost. Further, due to the manufacture of the rear frames 11 by extrusion molding, an error in size attributed to spring back after molding such as press molding does not occur. Thus, the molding accuracy can be improved thus providing the rear frames 11 with a high degree of accuracy and, at the same time, the through holes 20 and the cross frame 12 can be brought into contact with each other without an error.

Further, the through holes 20 formed in the rear frames 11 respectively can enhance ventilation property of air in the inside of the vehicle body and, particularly, an air intake performance toward the air cleaner 50 is improved by the through holes formed in the vicinity of the air cleaner 50 so that air supply efficiency toward the engine 40 is increased. Further, the through holes 20 are formed substantially at the same height as the battery case opening 48kh which is opened in a rear portion of the battery case 48k. Thus, it is possible to smoothly supply air to the battery 48 thus increasing the battery cooling effect.

Although one embodiment of the invention has been explained heretofore, the invention is not limited to the above-mentioned embodiment, and various modifications are conceivable. For example, in the above-mentioned embodiment, by forming the through hole 20 in the rear frames 11 respectively, the cross frame 13 is mounted on the rear frames 11. However, through holes may be formed in other skeletal frames other than the rear frames 11. For example, through holes may be formed in the cross frames 13, 14 which connect the pivot frames 4 to each other or in the cross frame 15 which connects the main frames 3 and the down frames 7 to each other.

Although the cross frame 12 of the above-mentioned embodiment has an approximately C shape in transverse cross section corresponding to the rounded rectangular through hole 20, the shape of the cross frame 12 is not limited to such a shape, and the cross frame 12 may have another polygonal shape, a circular shape and an elliptical shape in transverse cross section, and the shape of the cross frame 12 is not particularly limited provided that a cross-sectional shape of the cross frame 12 corresponds to a shape of the through hole.

The rear frame 11 of the above-mentioned embodiment is configured to reduce a thickness in a vehicle height direction and a width in a vehicle width direction toward a rear side in the longitudinal direction of the vehicle. However, in the invention, the rear frame 11 may be configured to gradually decrease at least one from either a thickness in a vehicle height direction or a width in a vehicle width direction toward a rear side in the longitudinal direction of the vehicle.

Although the cross frame 12 and the rear frame 11 are joined to each other by welding in the above-mentioned embodiment, another suitable joining form such as bonding, fusing or adhesion is applicable to joining of the cross frame 12 and the rear frame 11 besides welding.

In the above-mentioned embodiment, an explanation has been made with respect to the motorcycle. However, the invention is also applicable to other saddle-ride-type vehicles such as a buggy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body frame of a saddle-ride vehicle comprising:
   a plurality of skeletal frames arranged to face each other in an opposed manner; and
   a cross frame for connecting the plurality of skeletal frames to each other;
   wherein through holes are formed in the skeletal frames arranged to face each other in an opposed manner; and
   the cross frame is joined to the skeletal frame at insertion portions thereof inserted into the through holes;
   wherein distal end portions of the cross frame are welded to inner surfaces of the through holes and the cross frame is formed into a C shape where at least a portion of a transverse cross section is discontinuous.

2. The vehicle body frame of a saddle-ride vehicle according to claim 1, wherein the through holes are formed in portions of the skeletal frames arranged parallel to each other in an opposedly facing manner, and the through holes are formed in the skeletal frames in a penetrating manner such that the through holes face each other in an opposed manner.

3. The vehicle body frame of a saddle-ride vehicle according to claim 1, wherein a C-shaped end portion of the cross frame is disposed on a rear side in a longitudinal direction of the vehicle, and
   a bracket is continuously formed on the end portion.

4. The vehicle body frame of a saddle-ride vehicle according to claim 1, wherein the skeletal frames include:
   a main frame extending toward the rear side in the longitudinal direction of the vehicle from a head pipe;
   a pivot frame extending downwardly from a rear side of the main frame;
   a seat frame extending toward the rear side in the longitudinal direction of the vehicle from the main frame;
   a support frame extending toward the rear side in the longitudinal direction of the vehicle and upward from the pivot frame; and
   a rear frame extending toward a rear side of the seat frame;
   wherein a merging portion for merging the rear frame with the seat frame and the support frame is formed on the rear frame, and the through hole is formed in the rear frame; and
   the cross frame is mounted in the through holes.

5. The vehicle body frame of a saddle-ride vehicle according to claim 2, wherein the skeletal frames include:
   a main frame extending toward the rear side in the longitudinal direction of the vehicle from a head pipe;
   a pivot frame extending downwardly from a rear side of the main frame;
   a seat frame extending toward the rear side in the longitudinal direction of the vehicle from the main frame;
   a support frame extending toward the rear side in the longitudinal direction of the vehicle and upward from the pivot frame; and
   a rear frame extending toward a rear side of the seat frame;
   wherein a merging portion for merging the rear frame with the seat frame and the support frame is formed on the rear frame, and the through hole is formed in the rear frame; and
   the cross frame is mounted in the through holes.

6. The vehicle body frame of a saddle-ride vehicle according to claim 4, wherein the rear frame is formed wherein at least one from either a thickness of the rear frame in a vehicle height direction or a width of the rear frame in a vehicle width direction is reduced toward a rear side in a longitudinal direction of the vehicle.

7. The vehicle body frame of a saddle-ride vehicle according to claim 4, wherein rear fenders are provided with fender support portions to which rear end portion of the rear frame are inserted therein wherein the rear fenders are capable of being supported.

8. The vehicle body frame of a saddle-ride vehicle according to claim 6, wherein rear fenders are provided with fender support portions to which rear end portion of the rear frame are inserted therein wherein the rear fenders are capable of being supported.

9. The vehicle body frame of a saddle-ride vehicle according to claim 1, wherein the through holes are simultaneously formed in an extruding direction at the time of forming the skeletal frame by extrusion molding.

10. The vehicle body frame of a saddle-ride vehicle according to claim 2, wherein the through holes are simultaneously formed in an extruding direction at the time of forming the skeletal frame by extrusion molding.

11. A vehicle body frame of a saddle-ride vehicle comprising:

a left skeletal frame and a right skeletal frame, said left and right skeletal frames being arranged to face each other in an opposed manner;

a cross frame for connecting the left and right skeletal frames to each other;

through holes being formed in the left and right skeletal frames arranged to face each other in an opposed manner;

said cross frame being joined to the skeletal frame at insertion portions thereof inserted into the through holes; and said through holes being simultaneously formed in an extruding direction at the time of forming the skeletal frame by extrusion molding;

wherein distal end portions of the cross frame are welded to inner surfaces of the through holes and the cross frame is formed into a C shape where at least a portion of a transverse cross section is discontinuous.

12. The vehicle body frame of a saddle-ride vehicle according to claim 11, wherein the through holes are formed in portions of the left and right skeletal frames arranged parallel to each other in an oppositely facing manner, and the through holes are formed in the left and right skeletal frames in a penetrating manner such that the through holes face each other in an opposed manner.

* * * * *